US006360088B1

United States Patent
Shi et al.

(10) Patent No.: US 6,360,088 B1
(45) Date of Patent: Mar. 19, 2002

(54) ANTENNA DIVERSITY SWITCHING SYSTEM AND METHOD FOR SELECTING AN ANTENNA THROUGH A PROGRAMMED EVALUATION

(75) Inventors: Hong Shi, Cary; Steve Geist, Raleigh, both of NC (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/159,525

(22) Filed: Sep. 23, 1998

(51) Int. Cl.[7] .............................. H04B 1/06; H04Q 7/00
(52) U.S. Cl. ..................................... 455/277.1; 370/334
(58) Field of Search ..................... 370/334; 455/277.2, 455/277.1, 269, 272, 275

(56) References Cited

U.S. PATENT DOCUMENTS

| | | | | |
|---|---|---|---|---|
| 4,584,713 A | * | 4/1986 | Bruckert et al. | 455/277.2 |
| 5,168,574 A | * | 12/1992 | Gordon et al. | 455/15 |
| 5,203,024 A | * | 4/1993 | Yamao | 455/133 |
| 5,241,701 A | * | 8/1993 | Andoh | 455/272 |
| 5,648,992 A | * | 7/1997 | Wright et al. | 375/347 |
| 5,940,454 A | * | 8/1999 | McNicol et al. | 375/347 |
| 5,952,963 A | * | 9/1999 | Shen et al. | 342/367 |
| 5,960,046 A | * | 9/1999 | Morris et al. | 375/347 |
| 6,085,076 A | * | 7/2000 | Lindsay et al. | 455/277.1 |
| 6,118,773 A | * | 9/2000 | Todd | 370/334 |

FOREIGN PATENT DOCUMENTS

EP          0755131 A2  *  1/1997    ............ H04B/7/08

* cited by examiner

Primary Examiner—Vivian Chang
Assistant Examiner—Charles N. Appiah
(74) Attorney, Agent, or Firm—Ericsson Inc.

(57) ABSTRACT

A system, method, and program for selecting an antenna from a plurality of antennas in a wireless communication system having a dynamic frequency range is disclosed. This disclosure describes how a singular quality indicator derived from a plurality of quality parameters improves diversity selections in uplink or downlink channels integrated in time or separated in frequency. The quality indicator is derived in part from a synchronization, a cyclical redundancy check, and a differential receive signal strength indicator process. The processes modify a quality indicator when a sync error, a cyclical redundancy check error, or one of a number of receive signal strength conditions is detected. When a predetermined quality threshold exceeds the quality indicator at any point in time antenna selection occurs.

25 Claims, 6 Drawing Sheets

ANTENNA DIVERSITY SWITCHING SYSTEM AND METHOD FOR SELECTING AN ANTENNA THROUGH A PROGRAMMED EVALUATION

BACKGROUND OF THE INVENTION

This disclosure relates to a process for selecting an antenna in a wireless communication system having a plurality of antennas. In particular, the present invention is designed to select an antenna that provides superior transmission and reception quality using a singular quality indicator that reflects a plurality of quality parameters.

In wireless communication systems, incoming signals may experience time dispersion and fading which is known as multipath interference. Multipath interference is caused by the destructive interference of radio waves arriving at an antenna through diverse paths. In wireless technology, the phase differences of signals arriving at a receiver through diverse paths can cause distortion that detracts from signal quality. Conventional wireless technology utilizes spatial diversity to minimize multipath interference. A wireless network commonly includes more than one antenna positioned such that the signals received by the antennas are not correlated.

When more than one antenna is used in a wireless system, a protocol is employed for antenna selection. Normally, antenna selection is based on a received signal quality assessment. In some wireless communication systems, such as Time Division Duplex (TDD), uplink and downlink channels are coupled. The assimilation of uplink and downlink channels transmitted in a common frequency separated only in time means that both channels suffer from the constructive and destructive reflections of signals arriving at an antenna through diverse paths. Accordingly, a process that minimizes multipath interference, such as spatial diversity, benefits the uplink and downlink channels together as they are transmitted and received in a single frequency.

In Frequency Time Division Duplex (FTDD), full duplex communication is established by separating the uplink and downlink channels in frequency. This means that an antenna transmitting a high quality signal at an uplink frequency will not necessarily receive a high quality signal at a downlink frequency. Furthermore, as a receiver or transmitter moves from one location to another, the phase relationship between diverse signals changes relative to their motion which may cause one frequency to suffer from a different set of losses and reflections than another frequency. Accordingly, the multipath interference that comes and goes from the scattering of signals from obstacles in a signal's path is different under a Time Division Multiple Access (TDMA)/TDD format then under a TDMA/FTDD format.

The co-existence of variety in TDMA wireless communication systems has likely lead to a continuing development of single use hardware and software dedicated to multiple TDMA formats. As demand for TDMA wireless communication grows, the need to mitigate multipath interference also grows, as does the costly demands of supporting single use hardware and software in multiple TDMA formats.

Accordingly, there is a need for achieving the benefits of diversity reception through a common system, method, and program whereby one or more frequencies are transmitted or received by one or more antennas selected by a single routine. The system, method, and program must be adaptable to the dynamic frequencies of uplink and downlink channels integrated in time or separated in frequency and seamlessly integrate a multiple quality assessment of signal quality that effectively discriminates against multipath interference.

SUMMARY OF THE INVENTION

A system, method, and program for selecting an antenna from a plurality of antennas in a wireless communication system having a dynamic frequency range is disclosed. This disclosure describes how a singular quality indicator derived from a plurality of quality parameters improves diversity selections in uplink or downlink channels integrated in time or separated in frequency. The quality indicator is derived in part from a synchronization, a cyclical redundancy check, and a differential receive signal strength indicator process. The processes modify a quality indicator when a sync error, a cyclical redundancy check error, or one of a number of receive signal strength conditions is detected. When a predetermined quality threshold exceeds the quality indicator at any point in time, antenna selection occurs.

DETAILED DESCRIPTION OF THE PRESENTLY PREFERRED EMBODIMENTS

Figure 1:
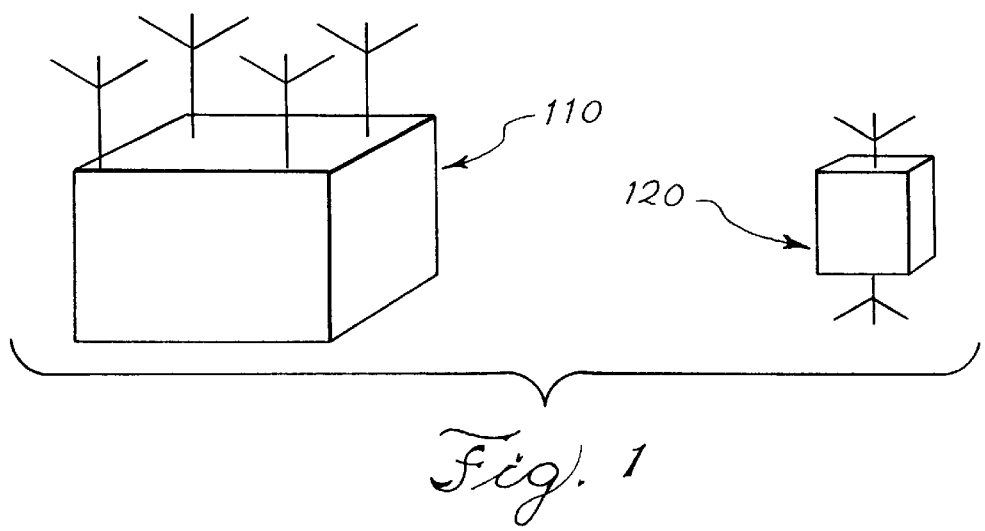
FIG.1 illustrates a base station and a wireless device.

In the drawings depicted elements are not necessarily drawn to scale and the same reference numbers through several views designate alike and similar elements.

FIG. 1 illustrates a plurality of wireless communication hardware that provides flexible communication of voice and data comprising a base station 110 and a wireless device 120. The base station 110 and wireless device 120 each comprise a receiver, a transmitter, a plurality of antennas, and a plurality of accompanying electronic circuitry. The electronic circuitry, which may comprise a microprocessor or micro-controller for facilitating antenna selection, preferably manages system resources, information exchanges, and antenna selections through the execution of a microprocessor readable code. Preferably, the microprocessor readable code written in C, C++ or higher level programmable languages is stored on a microprocessor readable medium such as magnetic memory, optical memory, and integrated circuits.

Figure 2:
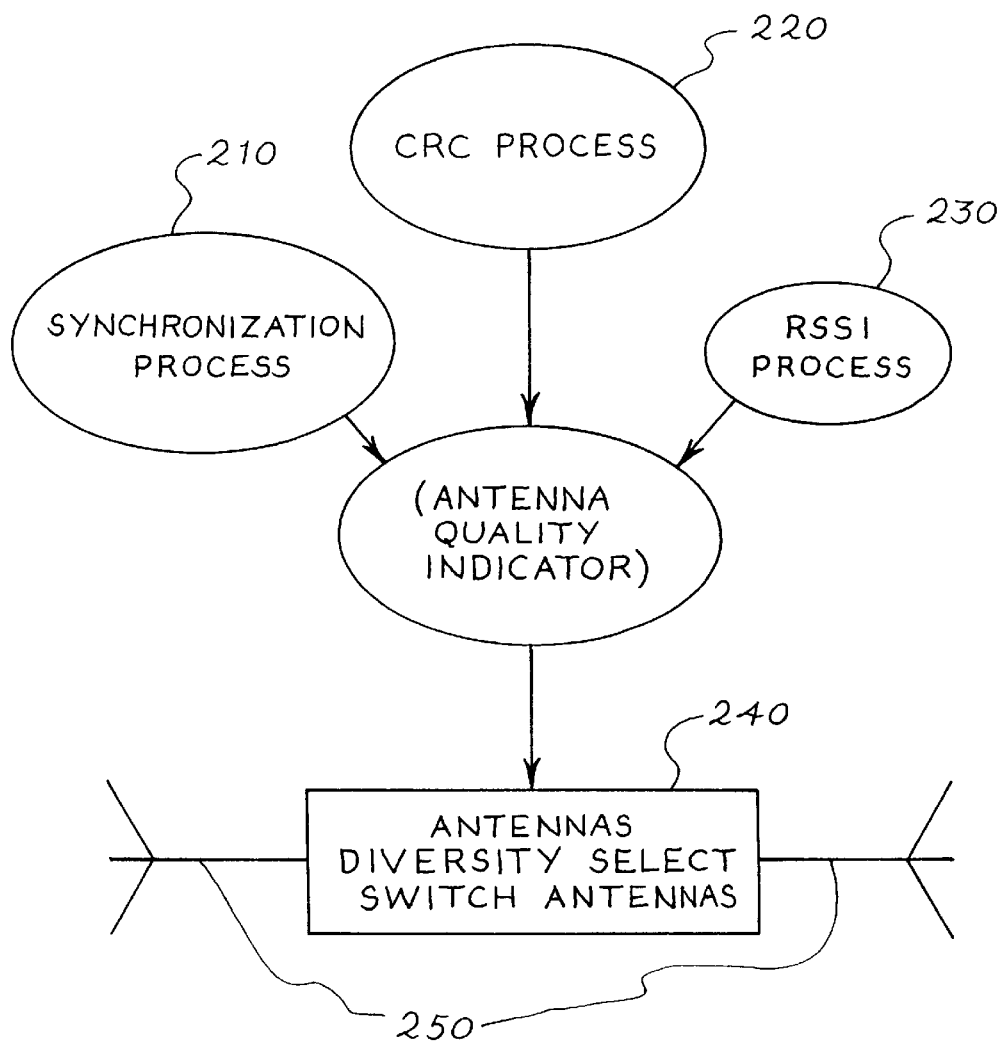
FIG. 2 is a diagram of a plurality of quality parameters capable of modifying a quality indicator in the base station or wireless device.

FIG. 2 illustrates a plurality of quality parameters associated with a quality indicator that may be practiced in the base station or the wireless device. In wireless communication, multiple quality parameters may be practiced to reduce the distortion caused by multipath interference. The FIG. 2 illustration, for example, comprises a synchronization process 210, a cyclical redundancy check (CRC) process 220, and a differential receive signal strength indicator (RSSI) process 230. Preferably, the multiple quality parameters (210, 220, and 230) are switchably linked to a plurality of antennas 250 through a switching process residing within a switching device 240. Each quality parameter is preferably translatable into logic routines or microprocessor readable code residing in an integrated or a separate memory device that can communicate with the switching device 240. Preferably, the switching device 240 resides in the base station 110 (shown in FIG. 1).

Figure 3:
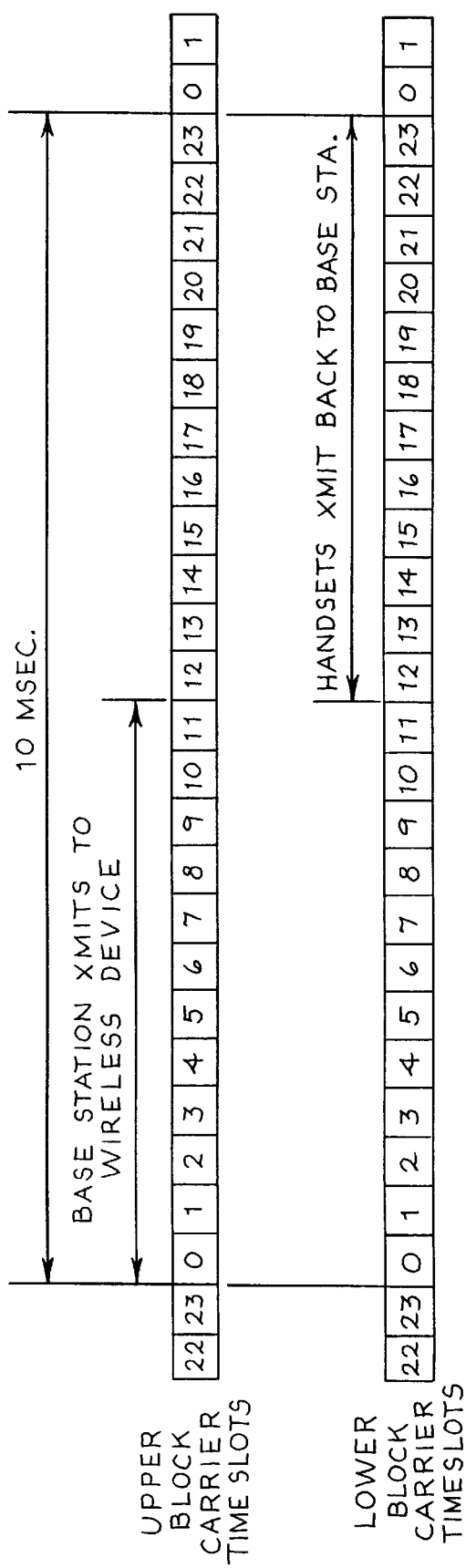
FIG. 3 is a block diagram of a time frame divided into a plurality of time and frequency slots in a TDMA/FTDD format that may be utilized in the base station and wireless device.

FIG. 3 illustrates a timing pattern according to a standard TDMA/FTDD format. According to the TDMA/FTDD format, a base station 110 (shown in FIG. 1) uses an upper block carrier frequency for transmissions in slots zero through eleven and a lower block carrier frequency for reception in slots twelve through twenty-three. The wireless device 120 (shown in FIG. 1) uses the lower block carrier frequency for transmission in slots twelve through twenty-three and uses the upper block carrier frequency for reception in slots zero through eleven. Accordingly, a radio link may be created between the base station 110 and the wireless device 120, where the base station 110 transmits in slot zero and receives in slot twelve and the wireless device 120 receives in slot zero and transmits in slot twelve.

Utilizing the standards of the TDMA/FTDD format, a plurality of pre-calculated quality indicators may be assigned to the TDMA/FTDD frequencies before any of the multiple quality link indicators are employed. The synchronization process 210, the cyclical redundancy check process 220, and the differential receive signal strength indicator or the receive signal strength indicator process 230 may then be utilized to select antennas after a base station 110 or a wireless device's 120 reception. As noted previously, the TDMA/TDD format assimilates transmitting and receiving channels in one frequency, and therefore, only a single quality indicator is needed to assess signal quality in a manner analogous to one of the frequencies employed in the TDMA/FTDD format.

One quality parameter associated with the quality indicator is the synchronization process 210. In the synchronization process 210, a synchronization value is transmitted in a receiving slot. When the base station 110 or the wireless device 120 loses synchronization, a sync error is detected and the quality indicator is modified.

Another quality parameter associated with the quality indicator is the cyclical redundancy check (CRC) 220 process. CRC 220 is based on polynomial division in which each bit of a packet of data in a receiving slot represents one coefficient of a polynomial. The polynomial is then divided by a pre-programmed polynomial to yield a quotient polynomial and in some conditions a remainder polynomial. When the division yields a remainder polynomial, the process detects a cyclical redundancy error and modifies the quality indicator. When the division yields no remainder polynomial, the quality indicator is not modified.

Another quality parameter associated with the quality indicator is the differential receive signal strength indicator process otherwise referred to as the receive signal strength indicator process 230. In this process, a received signal strength indicator (RSSI) is compared to an RSSI of a previous received signal. Based on an RSSI comparison, an RSSI difference (RSSI delta) is generated ($RSSI_{delta} = RSSI_{current} - RSSI_{previous}$) which on an appropriate condition modifies the quality indicator.

The quality indicator passed to and from the processes are transparent to the user and those of ordinary skill in the art will appreciate the disclosure's modular design which envisions the addition and or deletion of other diverse quality assessment processes known in the wireless communication art.

Figure 4:
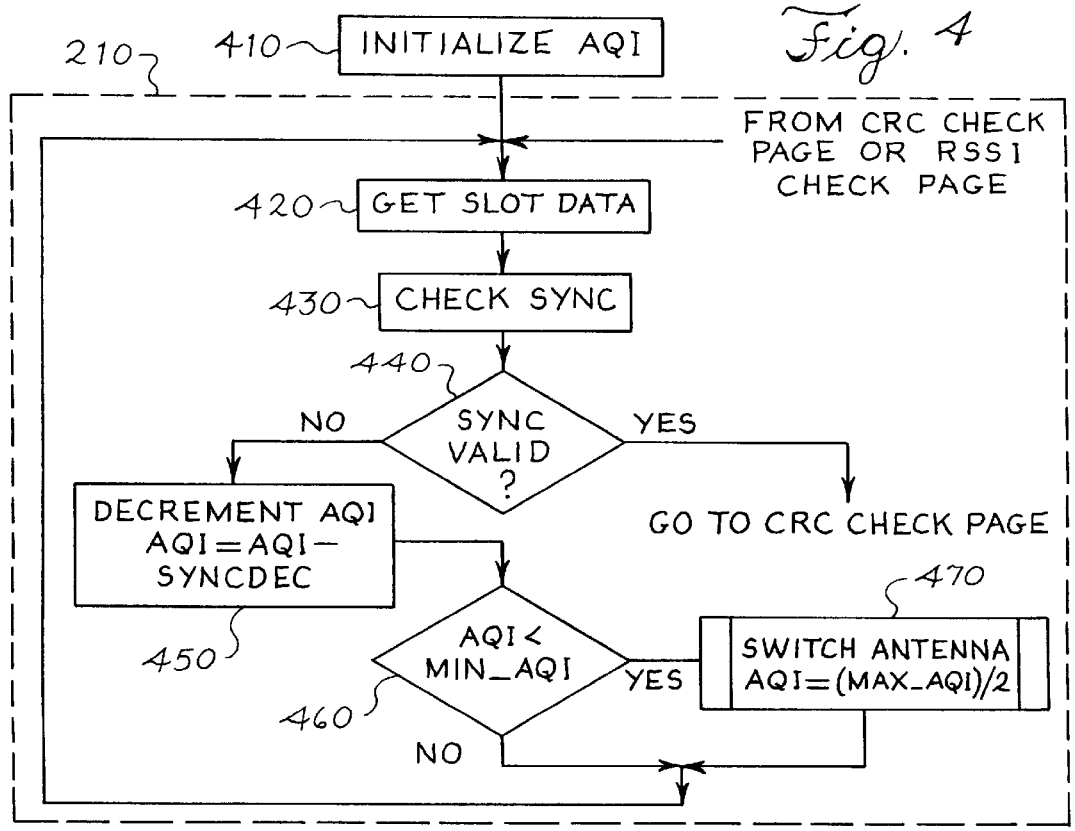
FIGS. 4–6 are a flow chart of the first embodiment.
Figure 5:
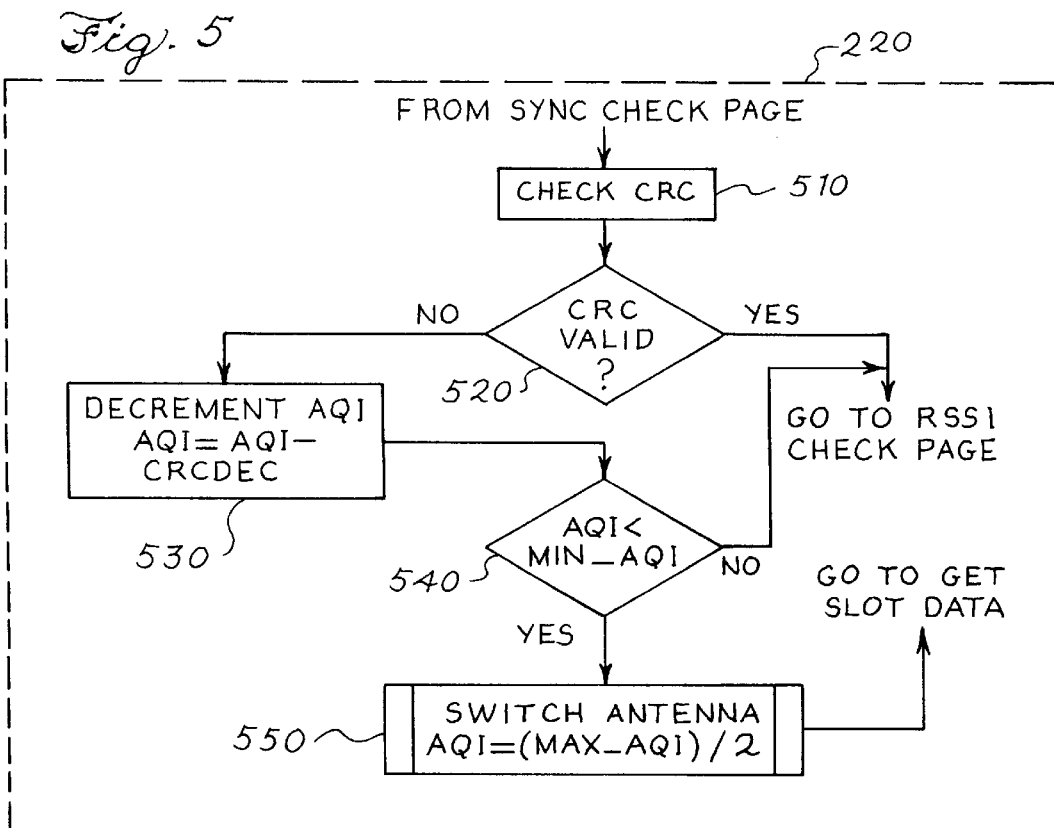
Figure 6:
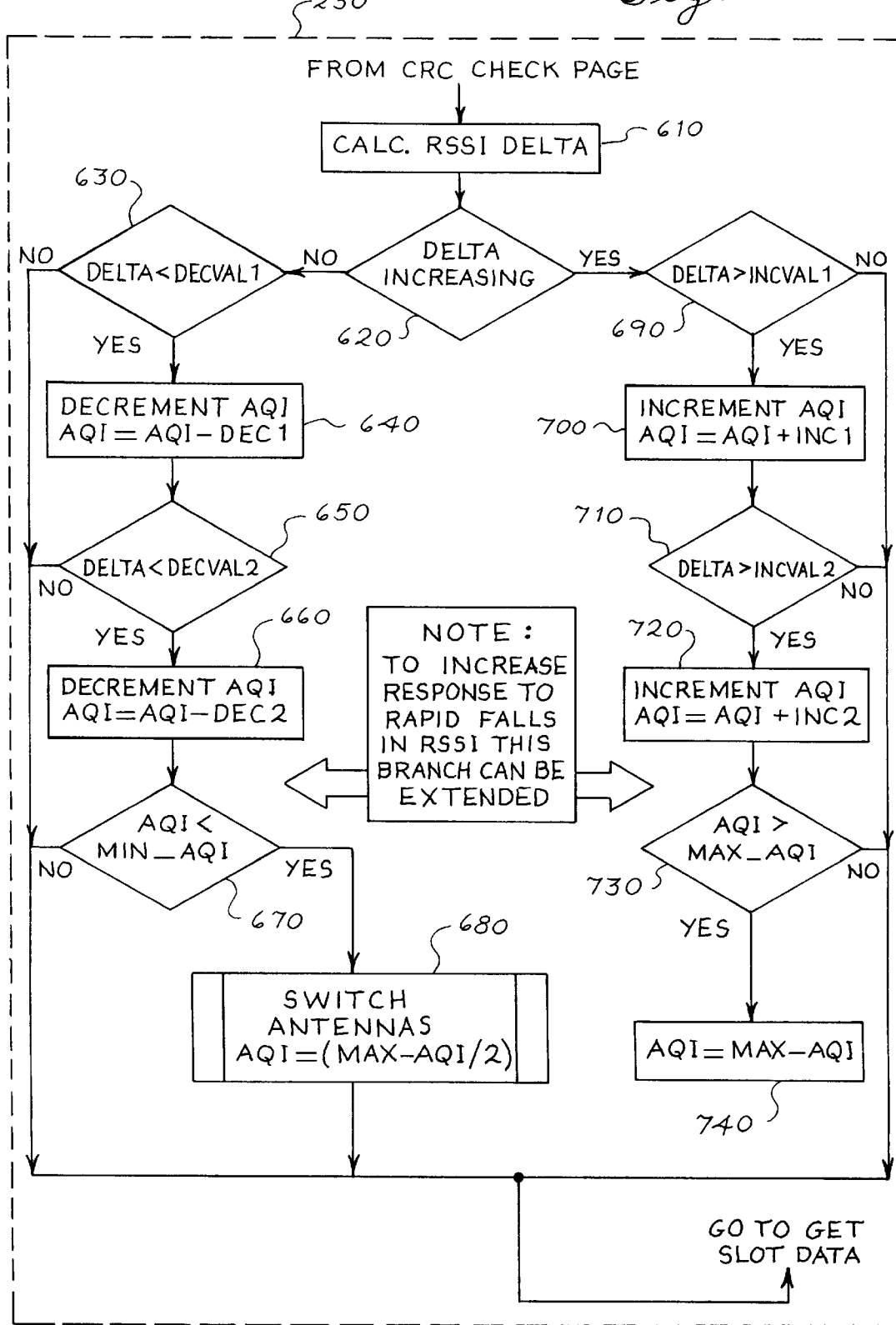

FIGS. 4–6 are a flowchart illustrating the modular design of a first embodiment. The FIG. 4 illustration discloses a process for detecting a sync error. The process begins after a quality indicator (AQI) is initialized at a step 410. At a step 420, the process receives and decodes a plurality of physical link data encoded in a received signal. At steps 430 and 440, it is determined whether a synchronization signal was received and whether that signal is valid. When the synchronization signal is valid, the entire quality indicator is passed to a CRC process 220. When the synchronization signal is invalid, a sync error is detected, and the process proceeds to a step 450. At step 450, the process reduces the quality indicator by a weighted value (SYNCDEC). When a minimum predetermined quality threshold (MIN_AQI) is less than the quality indicator, the synchronization process passes the quality indicator to the CRC process 220. When the minimum predetermined quality threshold exceeds the quality indicator (AQI<MIN_AQI) at a step 470, antenna selection occurs, the quality indicator is reconditioned (AQI=(MAX_AQI)/2), and the process returns to step 420. In operation, the reconditioning of the quality indicator will depend on the receiving characteristics of the wireless system. The reconditioning of the quality indicator (MAX_AQI/2) illustrates the process's adaptability to a variety of environmental conditions.

FIG. 5 illustrates a flow-chart for detecting a CRC error. At a step 510, the process decodes physical CRC link data encoded in the received signal. At a step 520, it is determined whether a CRC error exists based on the polynomial division previously described. When the division yields a remainder polynomial, the process detects a cyclical redundancy error, and modifies the quality indicator at steps 520 and 530. When the division yields no remainder polynomial, the quality indicator is not modified and is passed to the RSSI process 230. On the detection of a cyclical redundancy error the quality indicator is reduced by a weighted value (CRCDEC) and compared to the minimum predetermined quality threshold (MIN_AQI) at a step 540. When the minimum predetermined quality threshold is less than the quality indicator, the CRC process 220 passes the quality indicator to the RSSI process 230 at step 540. If the minimum predetermined quality threshold exceeds the quality indicator (AQI<MIN_AQI), antenna selection occurs, the quality indicator is reconditioned (AQI=(MAX_AQI)/2), and the process passes the quality indicator to the synchronization process 210 at steps 540 and 550. Like the synchronization process 210, the reconditioning of the quality indicator (MAX_AQI/2) allows the process to be adapted to the acoustical properties of a variety of wireless communication environments.

FIG. 6 illustrates a flow-chart for implementing the differential receive signal strength indicator process 230 also referred to as the receive signal strength indicator (RSSI) process. According to the logic structure of FIG. 6, at a step 610, the RSSI process 230 receives the quality indicator, and calculates an RSSI difference (RSSI delta) as previously described. When it is determined that the RSSI difference is negative, preferably in a weak signal condition, the RSSI difference is compared to a first predefined value (DECVAL1) at a step 630. When the RSSI difference is greater than the first predefined value, it is determined that insignificant differences exist between the RSSI signals and the quality indicator is passed to the synchronization process 210 unmodified. When the RSSI difference is less than the first predefined value, the quality factor is reduced by a weighted value (DEC1) and compared to a second predefined value (DECVAL2) at steps 640 and 650. When the RSSI difference is greater than the second predefined value (DECVAL2) the quality indicator is passed to the synchronization process 210 at step 650. The comparison of the quality factor to the second predefined value allows the process to further modify the quality indicator by either a linear or a nonlinear function. At steps 660 and 670, the quality indicator is reduced by a weighted value (DEC2) and compared to the minimum predetermined quality threshold (MIN_AQI). When the minimum predetermined quality threshold is less than the quality indicator, the RSSI process 230 passes the quality indicator to the synchronization process 210 at step 670. If the minimum predetermined quality threshold exceeds the quality indicator (AQI<MIN_AQI), antenna selection occurs, the quality indicator is reconditioned (AQI=(MAX_AQI)/2), and the process passes the quality indicator to the synchronization process 210 at steps 670 and 680. Like the synchronization process 210 and the cyclical redundancy check process 220, the reconditioning of the quality indicator (MAX_AQI/2) allows the process to be adapted a variety of wireless communication environments.

FIG. 6 further illustrates an RSSI assessment of a strengthening signal. According to the logic structure of FIG. 6, at a step 620, the RSSI process 230 receives the quality indicator and calculates an RSSI difference (RSSI delta) as previously described. When it is determined that the RSSI difference is positive, preferably in a strong signal condition, the RSSI difference is compared to a third predefined value (INCVAL1) at a step 690. When the RSSI difference is less than the third predefined value, it is determined that insignificant differences exist between the RSSI signals and the quality indicator is passed to the synchronization process 210 unmodified. When the RSSI difference is greater than the third predefined value, the quality factor is increased by a weighted value (INC1) and compared to a fourth predefined value (INCVAL2) at steps 700 and 710. When the RSSI difference is less than the fourth predefined value, the quality indicator is passed to the synchronization process 210 at step 710. The comparison of the quality factor to the fourth predefined value allows the process to further modify the quality indicator by either a linear or a nonlinear function. At steps 720 and 730, the quality indicator is increased by a weighted value (INC2) and compared to a maximum predetermined quality threshold (MAX_AQI). When the maximum predetermined quality threshold is less than the quality indicator, the quality threshold is reset to the maximum predetermined quality threshold and the RSSI process 230 passes the quality indicator to the synchronization process 210 at steps 730 and 740. If the maximum predetermined quality threshold exceeds the quality indicator, the RSSI process 320 passes the quality indicator to the synchronization process 210 without further modification at step 730.

Workers of ordinary skill in the art will appreciate that the RSSI process steps responding to the rise or fall of RSSI signals may be extended. Thus, for example, the steps of comparing the quality indicator to the predefined value (DECVAL2) before reducing the quality indicator by the weighted value (DEC2) may be repeated before the quality indicator is compared to the minimum predetermined quality threshold (Min_AQI). Likewise, steps 710 and 720 may be repeated before the quality indicator is compared to the maximum predetermined quality threshold (MAX_AQI). These steps, in addition to the steps specifically described, may operate until a desired response is achieved through antenna selections.

Figure 7:
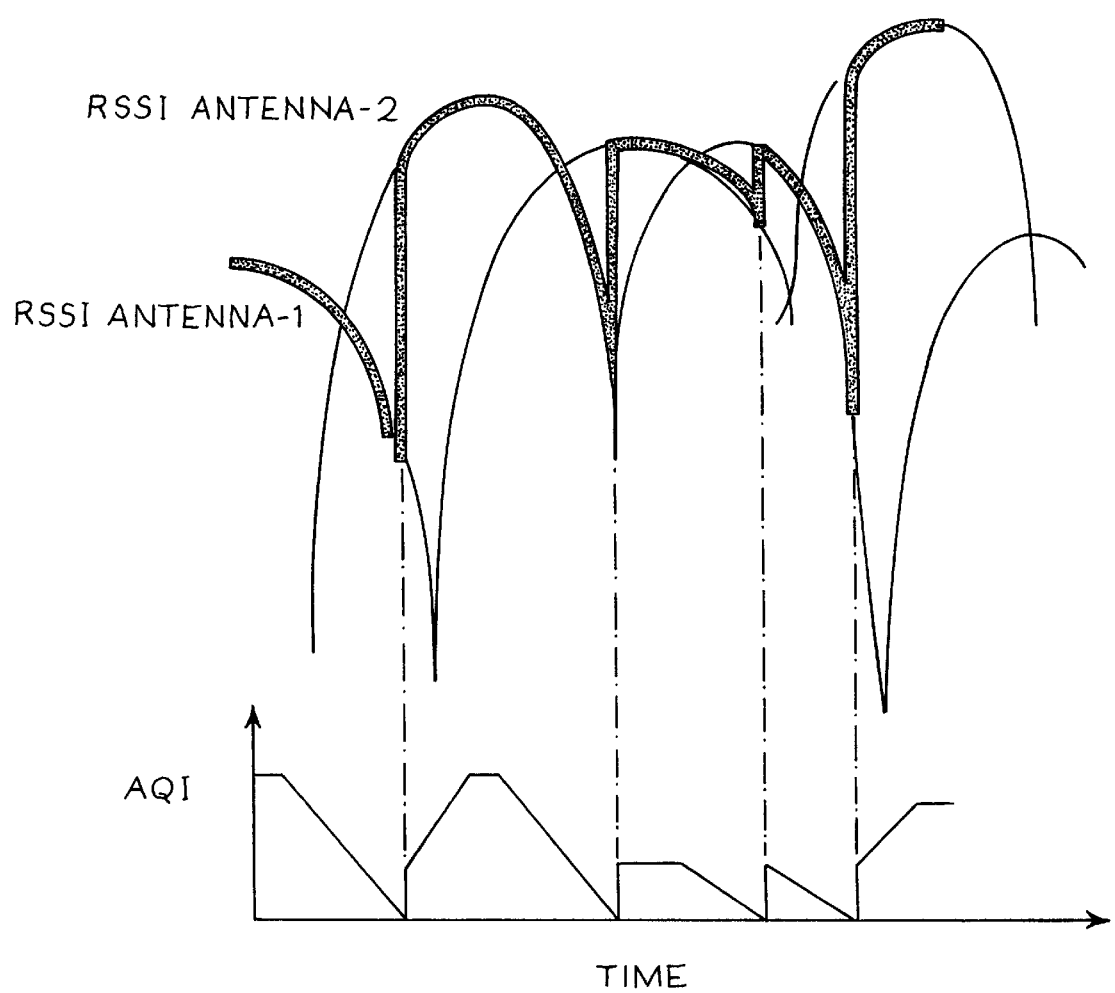
FIG. 7 is a timing diagram showing the relationship between a quality indicator waveform triggered by a receive signal strength indicator waveform in accordance with FIGS. 4–6.

FIG. 7 is a graph showing, for the RSSI process 230, a time relationship between the quality indicator (AQI) and the RSSI antenna selections. The FIG. 7 graph illustrates how the RSSI process selects a receiving antenna. As the quality indicator approaches zero, antenna selection occurs. The selective fading (waveform valleys) shown in the graph illustrates the destructive effect of signal fading and cancellation caused by multipath interference.

Wireless communication systems can make use of the above-described embodiments in a variety of ways. In the standard TDMA/FTDD wireless format, for example, the system, method, or program may be implemented in the base station and in the wireless device. In a TDMA/FTDD wireless system comprising a diversity of uplink and downlink antennas at the base station alone, the wireless device may request all uplink antenna selections when a minimum predetermined quality threshold (MIN_AQI$_{uplink}$) exceeds the wireless device's quality indicator (AQI$_{wireless\ device}$). Similarly, the base station may request all downlink antenna selections when a minimum predetermined quality threshold (MIN_AQI$_{downlink}$) exceeds the base station's quality indicator (AQI$_{base\ station}$).

Variants of the above techniques include implementing the system, method, and program in either base stations or wireless devices alone. When the process is implemented in a base station alone having a diversity of uplink and downlink antennas, the base station may request all uplink and downlink antenna selections when a minimum predetermined quality threshold (MIN_AQI$_{downlink}$) exceeds the base station's quality indicator (AQI$_{base\ station}$). Accordingly, the base station will request an uplink and a downlink antenna selection based on the integrity of the downlink signal alone much like a TDMA/TDD system. Similarly, when the process is implemented in the wireless device alone, the wireless device will request all uplink and downlink antenna selections based only on the integrity of the uplink signal alone. When a minimum predetermined quality threshold (MIN_AQI$_{uplink}$) exceeds the wireless device's quality indicator (AQI$_{wireless\ device}$) the wireless device will request an uplink and a downlink antenna selection.

It is further envisioned that the system, method, and programs described may be implemented in both wireless devices and base stations operating in one or more frequencies and that the wireless devices and base stations may jointly request uplink and downlink antenna selections.

In addition to the embodiments described, other modifications and variations are contemplated within the scope of the disclosure. The standards of the disclosure may also be expanded to encompass more than two integrated formats co-existing in a wireless communication system. Other protocols that make use of time and or frequency separation, for example, may also be used. Additionally, the order of the processes may be changed just as other quality parameters that provide more quality channel indications may be added and existing quality parameters may be removed.

EXAMPLES

Figure 8:
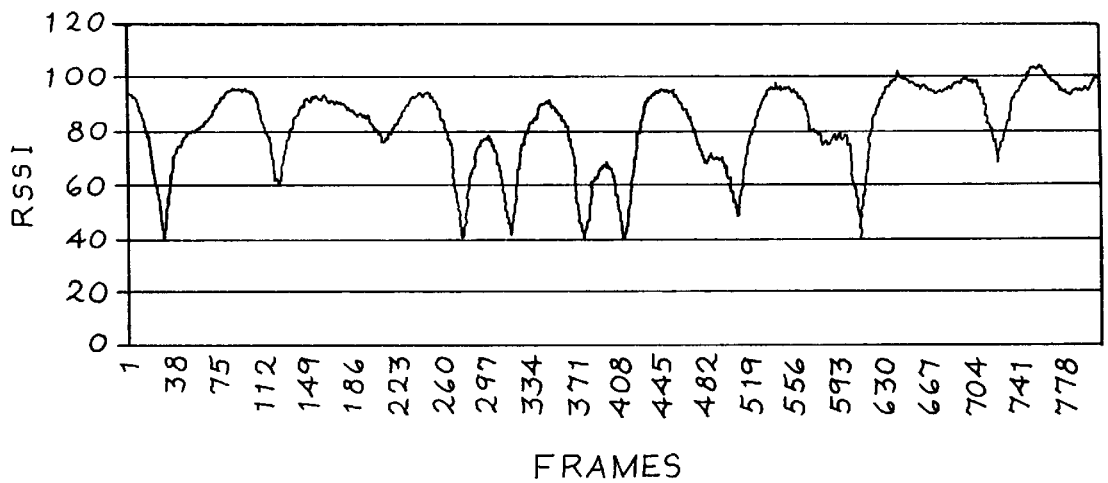
FIG. 8 is a timing diagram showing a receive signal strength waveform without diversity.
Figure 9:
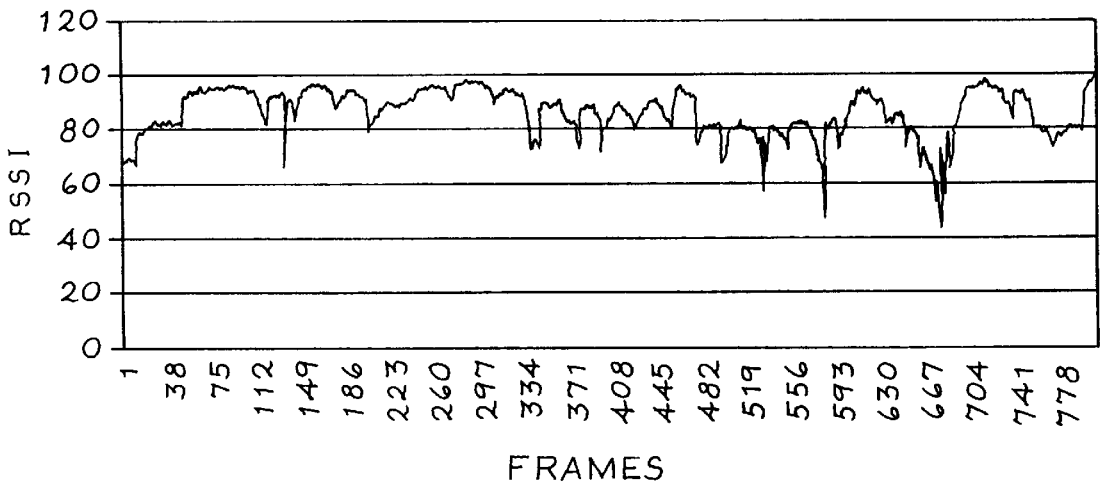
FIG. 9 is a timing diagram showing the receive signal strength waveform with diversity in accordance with FIGS. 4–6.

FIGS. 8 and 9 illustrate the superior transmission and reception quality of the disclosed embodiments. The system, method, and program were implemented in an Ericsson DCT 1900 RFP (Radio Fixed Part comprising a base station) and PP (Portable Part comprising a wireless device) for personal wireless communication utilizing a FTDD format. FIG. 8 illustrates an RSSI curve showing the destructive effect of signal fading and cancellation as seen in the width of the waveform's valleys. The waveform of FIG. 9 illustrates an RSSI curve under the same channel condition and power level as in FIG. 8, but operating under any of the system, method, or programs previously described. The waveform of FIG. 9 is distinguished from the waveform of FIG. 8 according to the number of fading dips and overall power levels of the received signal.

The concepts illustrated in the above embodiments may be implemented through software or logic circuitry. The disclosed embodiments enjoy utility in any wireless telecommunication system. Existing base stations and or wireless devices, for example, may be upgraded through reprogramming or hardware modifications.

Variations and modifications of the descriptions disclosed in this specification may be made without departing from the scope and spirit of the invention. The aforementioned description is intended to be illustrative rather than limiting and it is understood that the following claims and their equivalents set forth the scope of the invention.

We claim:

1. A wireless communication device susceptible to multipath interference, the device being capable of selecting an antenna based on the integrity of uplink and downlink channels, comprising:
   a plurality of antennas;
   a switching device switchably connected to said plurality of antennas, said switching device responsive to a quality factor for selecting a single antenna;
   a synchronization process in communication with said switching device and operative to modify said quality factor in response to the detection of a sync error;
   a cyclical redundancy check process in communication with said synchronization process and said switching device, said cyclical redundancy check process operative to modify said quality factor in response to the detection of a cyclical redundancy error; and
   a differential receive signal strength indicator process in communication with said cyclical redundancy check process operative to modify said quality factor in response to the detection of one of a plurality of receive signal strength conditions.

2. A wireless communication device according to claim 1, wherein said cyclical redundancy check process directly follows said synchronization process and directly precedes said receive signal strength indicator process.

3. A wireless communication system susceptible to multipath interference, the system being capable of selecting an antenna based on the integrity of uplink and downlink channels assimilated in time or separated in frequency, comprising:
   a plurality of antennas capable of receiving wireless signals;
   a switching process residing in a base station and switchably linked to said plurality of antennas, said switching process responsive to a quality factor for selecting a single antenna;
   a synchronization process in communication with said switching process and operative to modify said quality factor in response to the detection of a sync error;
   a cyclical redundancy check process in communication with said synchronization process and said switching process, said cyclical redundancy check process operative to modify said quality factor in response to the detection of a cyclical redundancy error; and
   a differential receive signal strength indicator process in communication with said cyclical redundancy check process and said switching process, said receive signal strength indicator process operative to modify said quality factor in response to the detection of one of a plurality of receive signal strength conditions.

4. A wireless communication system according to claim 3, wherein the selection of said antenna occurs when a predetermined quality threshold exceeds said quality factor.

5. A wireless communication system according to claim 3, wherein said quality factor is modified by a weighted value when said sync error is detected upon generation of an invalid synchronization signal.

6. A wireless communication system according to claim 3, wherein said quality factor is modified by a weighted cyclical redundancy check value when said cyclical redundancy error is detected.

7. A wireless communication system according to claim 3, wherein said quality factor is modified by one of a plurality of predefined receive signal strength values when one of said receive signal strength conditions is detected.

8. A wireless communication system according to claim 3, further comprises adjusting said quality factor when said antenna selection occurs.

9. A wireless communication system according to claim 8, wherein the integrity of said wireless signals is determined by said synchronization process after said antenna selection.

10. A method of selecting an antenna from a plurality of antennas for receiving at least one of a plurality of TDMA/TDD and TDMA/FTDD signals, said method, comprising the steps of:
    receiving signals from a plurality of antennas;
    processing said signals sequentially from a first synchronization process, to a second cyclical redundancy check process, to a third receive signal strength indicator process, so that a quality indicator is modified in response to at least one of said processes, and if a predetermined quality threshold exceeds said quality indicator after any of said first, second, and third processes, thereafter,
    selecting an antenna from said plurality of antennas.

11. The method of claim 10, wherein the modification of said quality indicator in said third process is a function of a current and a previous received signal strength.

12. The method of claim 11, further including the step of adjusting said quality indicator immediately before said first process.

13. The method of claim 11, further comprising the step of reconditioning said quality indicator after each antenna selection.

14. The method of claim 11, wherein the selection said antenna returns processing of said signals to said first process.

15. A computer usable medium having microprocessor readable program code embodied therein for causing a switching device to select an antenna from a plurality of antennas in response to a quality factor, the microprocessor readable code in an article of manufacture, comprising:
    first microprocessor readable program code for causing an electronic device to effect, with respect to a quality factor, the selection of an antenna in response to a synchronization process detection of a sync error;
    second microprocessor readable program code linked with said first microprocessor readable program code for causing said electronic device to effect, with respect to said quality factor, the selection of an antenna in response to a cyclical redundancy check process detection of a cyclical redundancy error; and third microprocessor readable program code linked with said second microprocessor readable program code for causing said electronic device to effect, with respect to said quality factor, the selection of an antenna in response to a receive signal strength indicator process detection of one of a plurality of receive signal strength conditions.

16. The article of manufacture of claim 15, wherein the electronic device is a base station comprising said switching device coupled to said plurality of antennas that are capable of processing a plurality of TDMA/TDD and TDMA/FTDD signals.

17. The article of manufacture of claim 15, wherein the electronic device is a wireless device and said switching device resides in a base station and is coupled to said plurality of antennas that are capable of receiving a plurality of TDMA/TDD and TDMA/FTDD signals.

18. A computer usable medium having microprocessor readable program code embodied therein for causing a base station to select an antenna from a plurality of antennas in response to a quality factor, the microprocessor readable code in an antenna diversity product, comprising:

first microprocessor readable program code for causing a wireless device to effect, with respect to a quality factor, the selection of an antenna in response to a synchronization process detection of a sync error;

second microprocessor readable program code linked with said first microprocessor readable program code for causing said wireless device to effect, with respect to said quality factor, the selection of an antenna in response to a cyclical redundancy check process detection of a cyclical redundancy error; and third microprocessor readable program code linked with said second microprocessor readable program code for causing said wireless device to effect, with respect to said quality factor, the selection of an antenna in response to a receive signal strength indicator process detection of one of a plurality of receive signal strength conditions.

19. A wireless communication system capable of selecting an antenna based on the integrity of at least one of a plurality of TDMA/TDD and TDMA/FTDD signals, said system comprising:

a base station, said base station configured to operate according to a TDMA/TDD and a TDMA/FTDD format and having a switching device switchably coupled to a plurality of antennas to select an antenna; and a wireless device wirelessly linked to said base station to request an antenna selection in response to a quality factor, said wireless device comprising:

a synchronization process operative to modify a quality factor in response to the detection of a sync error;

a cyclical redundancy check process in communication with said synchronization device, said cyclical redundancy check process operative to modify said quality factor in response to the detection of a cyclical redundancy error; and a receive signal strength indicator process in communication with said cyclical redundancy check process, said receive signal strength indicator process operative to modify said quality factor in response to the detection of one of a plurality of receive signal strength conditions.

20. The wireless communication system of claim 19, wherein said base station is further configured to request an antenna selection in response to a second quality factor, said base station further comprising:

a synchronization process operative to modify a second quality factor in response to the detection of a sync error;

a cyclical redundancy check process in communication with said synchronization process, said cyclical redundancy check process operative to modify said second quality factor in response to the detection of a cyclical redundancy error; and a receive signal strength indicator process in communication with said cyclical redundancy check process, said receive signal strength indicator process operative to modify said second quality factor in response to the detection of one of a plurality of receive signal strength conditions.

21. The wireless communication system of claim 20, wherein said switching device is switchably coupled to a plurality uplink channel antennas and a plurality of downlink channel antennas, said switching device configured to select an uplink channel antenna when requests from said wireless device are received and a downlink channel antenna when requests from said base station are received.

22. A wireless communication system capable of selecting an antenna based on the integrity of at least one of a plurality of TDMA/TDD and TDMA/FTDD signals, said system comprising:

a base station, said base station configured to operate according to a TDMA/TDD and a TDMA/FTDD format and having a switching device switchably coupled to a plurality of antennas to select an antenna, said base station comprising:

a synchronization process operative to modify a quality factor in response to the detection of a sync error;

a cyclical redundancy check process in communication with said synchronization process, said cyclical redundancy check process operative to modify said quality factor in response to the detection of a cyclical redundancy error; and a receive signal strength indicator process in communication with said cyclical redundancy check process, said receive signal strength indicator process operative to modify said quality factor in response to the detection of one of a plurality of receive signal strength conditions.

23. A method of selecting an antenna among a plurality of antennas based on an antenna quality indicator (AQI) for receiving radio frequency in a TDMA/TDD and TDMA/FTDD wireless communication system, comprising:

a) initializing the AQI;

b) retrieving time slot data;

c) implementing a synchronization process based on the time slot data;

d) evaluating the presence of a synchronization error;

e) decrementing AQI by a weighted value if synchronization error is determined;

f) comparing AQI to a minimum AQI value;

g) switching the antenna if AQI is less than the minimum AQI;

h) reconditioning AQI to respond to changes in a next antenna;

i) implementing a cyclical redundancy check (CRC) process if no synchronization error is determined;

j) determining CRC error;

k) decrementing AQI by a weighted value if a CRC error is detected;

l) repeating steps f–h;

m) repeating from step b;

n) implementing a receive signal strength indicator (RSSI) process if no CRC error is detected;

o) calculating a RSSI delta from old and new RSSI readings;

p) comparing RSSI delta to a predefined value to determine how RSSI delta is changing;

q) decrementing AQI if RSSI delta is less than the predefined value;

r) incrementing AQI if RSI delta is greater than the predefined value;

s) switching antenna if AQI is less than a minimum AQI;

t) setting AQI equal to a maximum AQI if AQI is greater than the maximum AQI;

u) repeating from step b.

24. A system for selecting an antenna in a TDMA/TDD and TDMA/FTDD wireless communication system, comprising:

a plurality of antennas for receiving radio frequency TDMA/TDD and TDMA/FTDD transmissions;

a synchronization process linked to said antennas for selecting one of said antennas based on a quality indicator, wherein said quality indicator is based at least partly on said synchronization process;

a cyclical redundancy check process communicating with said synchronization process and linked to said antennas for selecting one of said antennas based on said quality indicator, wherein said quality indicator is based at least partly on said cyclical redundancy check process; and a differential receiver signal strength indicator process communicating with said cyclical redundancy check process and linked to said antennas for selecting one of said antennas based on said quality indicator, wherein said quality indicator is based at least partly on said differential receive signal strength indicator process wherein said cyclical redundancy code process directly follows said synchronization process and directly preceded said differential receive signal strength indicator process.

25. A system for selecting an antenna in a TDMA/RDD and TDMA/FTDD wireless communication system, comprising:

a plurality of antennas for receiving radio frequency TDMA/RDD and TDMA/FTDD transmissions;

a synchronization process linked to said antennas for selecting one of said antennas based on a quality indicator, wherein said quality indicator is based at least partly on said synchronization process;

a cyclical redundancy check process communicating with said synchronization process and linked to said antennas for selecting one of said antennas based on said quality indicator, wherein said quality indicator is based at least partly on said cyclical redundancy check process; and a differential receive signal strength indicator process communicating with said cyclical redundancy check process and linked to said antenna for selecting one of said antennas based on said quality indicator, wherein said quality indicator is based at least partly on said differential receive signal strength indicator process, wherein the selection of said antenna in said synchronization process, said cyclical redundancy check process, and said differential receive signal strength indicator process occurs when a predetermined quality threshold exceeds said quality indicator.

* * * * *